United States Patent [19]

Koyama

[11] Patent Number: 5,105,465
[45] Date of Patent: Apr. 14, 1992

[54] SPEECH RECOGNITION APPARATUS
[75] Inventor: Motoaki Koyama, Yokohama, Japan
[73] Assignee: Kabushiki Kaisha Toshiba, Kawasaki, Japan
[21] Appl. No.: 487,391
[22] Filed: Mar. 2, 1990
[30] Foreign Application Priority Data
  Mar. 6, 1989 [JP] Japan .................................. 1-53166
[51] Int. Cl.⁵ .............................................. G10L 5/00
[52] U.S. Cl. ...................................... 381/43; 381/42
[58] Field of Search ............................. 381/41–43; 364/513.5

[56] References Cited
U.S. PATENT DOCUMENTS 4,581,755 4/1986 Sakoe .................... 381/42
4,712,242 12/1987 Rajasekaran .............. 381/42
4,715,004 12/1987 Kabasawa et al. ............. 364/513.5
4,989,248 1/1991 Schalk et al. .................. 381/42

FOREIGN PATENT DOCUMENTS 0085543 8/1983 European Pat. Off. .
0085545 8/1983 European Pat. Off. .

Primary Examiner—Emanuel S. Kemeny
Attorney, Agent, or Firm—Finnegan, Henderson, Farabow, Garrett, and Dunner

[57] ABSTRACT

Input speech is selectably stored in a RAM for specified (specific) speakers as alterable memory, or in a ROM for unspecified speakers as non-alterable memory. Comparison for speech recognition or speaker recognition—identification is done with a single recognition algorithm.

10 Claims, 4 Drawing Sheets

SPEECH RECOGNITION APPARATUS

BACKGROUND OF THE INVENTION

1. Field of the Invention

This invention relates to a speech recognition apparatus for recognizing information contained in a speech signal.

2. Description of the Related Art

Various algorithms for speech recognition have been provided, and the speech recognition rate or performance for all the types of speech units to be recognized cannot be improved without increasing the size and cost of the apparatus. Therefore, in the prior art, permissible limitations such as those on the number of words or speakers to be recognized are previously determined according to the application of the speech recognition apparatus, and an optimum recognition system is selected under the predetermined conditions.

FIG. 1 is a block diagram showing the construction of a conventional speech recognition apparatus. A band-pass filter (BPF) is arranged in an acoustic analyzing section 11, and a speech input to the acoustic analyzing section 11 is analyzed with short-time spectra for each preset period of time by means of the BPF so as to derive characteristic parameters. An output of the acoustic analyzing section 11 is processed by one of recognition units 15 and 16 which are selectively operated by a switching control unit 12 and switching circuits 13 and 14, and an optimum one of the recognition systems is selected to effect the recognition for the input speech.

The recognition unit 15 is a recognition unit for a specified speaker in which it is necessary to register the reference speech patterns every time the speaker is changed. The recognition for a speech input relating to the specified speaker and proper nouns is effected by the recognition unit 15. A changeable reference pattern memory 17 in which reference patterns can be alterably registered may be formed by a random access memory (RAM), for example, and the memory data thereof is read out by the recognition unit 15, after which and a similarity calculation process for obtaining the similarity between the memory data and the input speech analyzed by the acoustic analyzing unit 11 is performed. A DP matching (DTW: dynamic time warping) method is performed by the recognition unit 15. A matching degree (distance) is calculated and a category of reference patterns having the smallest distance is output as the recognition result.

The recognition unit 16 is a recognition unit used for unspecified speakers and storing general words or vocabularies, which are generally used by many people, in the form of reference patterns that cannot be alterably registered. The recognition for specified general words, such as numerals, is effected by the recognition unit 16. An unchangeable reference pattern memory 18 in which reference patterns cannot be alterably registered may be formed by a read only memory (ROM), for example. The memory data thereof is read out by the recognition unit 16 and a similarity calculation process for obtaining a similarity between the memory data and the input speech analyzed by the acoustic analyzing unit 11 is performed by recognition unit 16. A discriminant function method is performed by the recognition unit 16, and a category of reference patterns having the largest calculated similarity is output as the recognition result.

The switching method for switching a plurality of recognition units according to the application of the apparatus as described above is disclosed in Japanese Patent Disclosure (KOKAI) No. 49-3507. In the switching method disclosed therein, a logical determination is made according to the recognition results obtained in the recognition unit 15 or 16 and an optimum recognition result is selected and output based on the logical determination by means of the switching control unit 12.

However, with the above construction, two types of recognition units 15 and 16 must be provided to meet the respective applications. Furthermore, the switching circuits 13 and 14 and the switching control unit 12 for switching them are also required, making the construction of the apparatus complex and increasing the size and cost thereof.

In this way, in the prior art, it is necessary to provide recognition units having different algorithms corresponding to different types of limitations on the speakers, such as specified speakers or unspecified speakers. Conventional apparatus also place limitations on the ways of utterance in order to enhance the speech recognition performance of a speech recognition apparatus. As a result, the apparatus is of complex construction and increased size and cost.

SUMMARY OF THE INVENTION

Accordingly, an object of this invention is to provide a speech recognition apparatus which can be formed with small size and low cost without lowering the speech recognition rate or performance, irrespective of different types of limitations on the speakers and the ways of utterance.

An object of this invention is attained by a speech recognition apparatus which comprises an acoustic analyzing unit for extracting characteristic parameters of an input speech; a limitation-grouped speech reference pattern storing unit for storing speech reference patterns having different types of limitations on the speakers and the ways of utterance; and a similarity calculation unit for effecting the calculation of similarities between the analyzed patterns obtained from the acoustic analyzing unit and the speech reference patterns from the limitation-grouped speech reference pattern storing unit by use of a common recognition algorithm.

With the above construction, the calculation of similarities between an output signal of the acoustic analyzing unit and the speech reference patterns provided for respective types of speeches of the specified and unspecified speakers can be effected by means of the same similarity calculation unit. Optimum recognition data corresponding to the input speech can be derived from the similarity calculation unit.

Therefore, a speech recognition apparatus can be provided in which it is not necessary to prepare a recognition unit having a plurality of algorithms corresponding to different types of limitations on the speakers and the ways of utterance and the pattern recognition can be effected by use of one recognition unit so that the size and cost of the apparatus can be reduced without lowering the speech recognition performance.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

Figure 1:
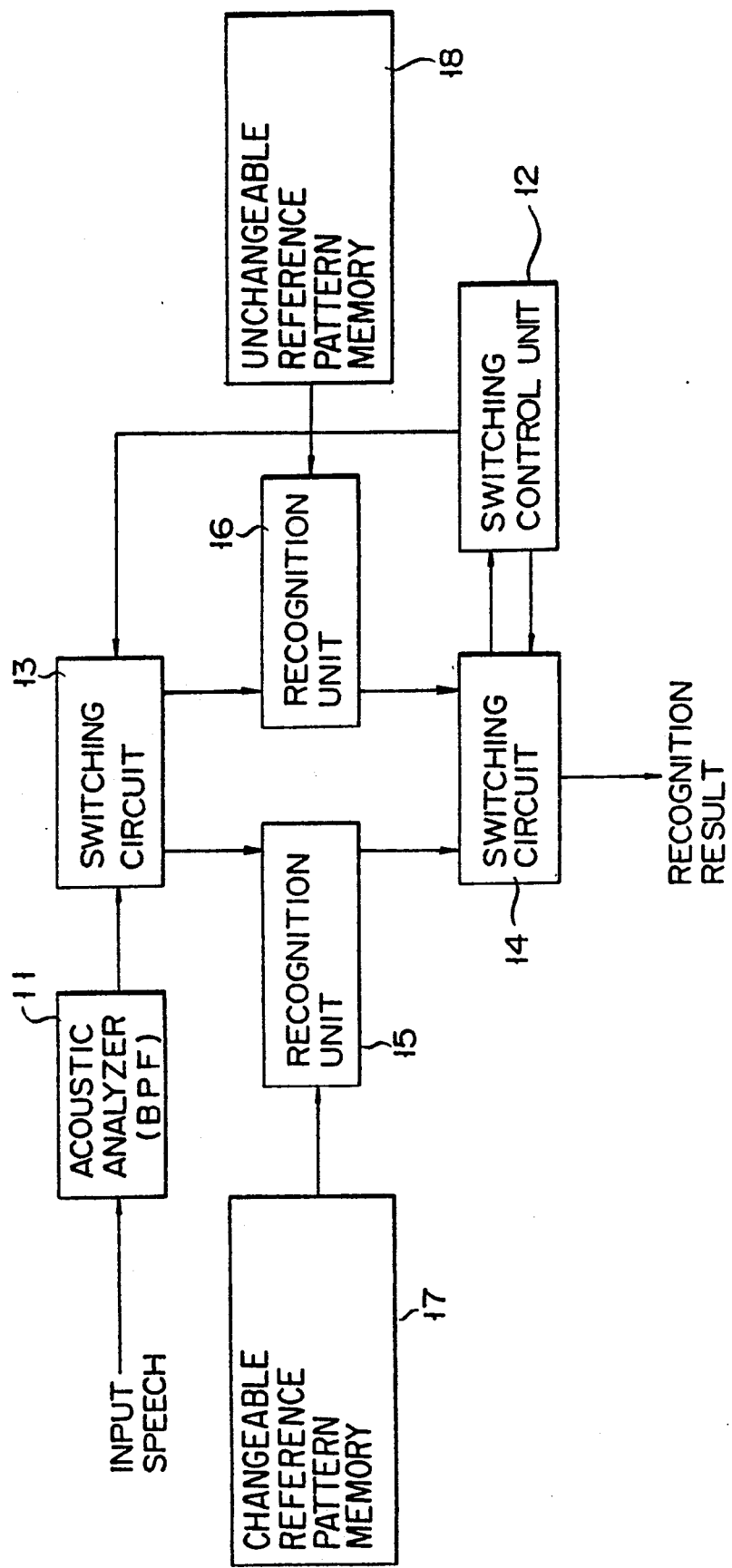
FIG. 1 is a block diagram showing a schematic construction of a conventional speech recognition apparatus.
Figure 2:
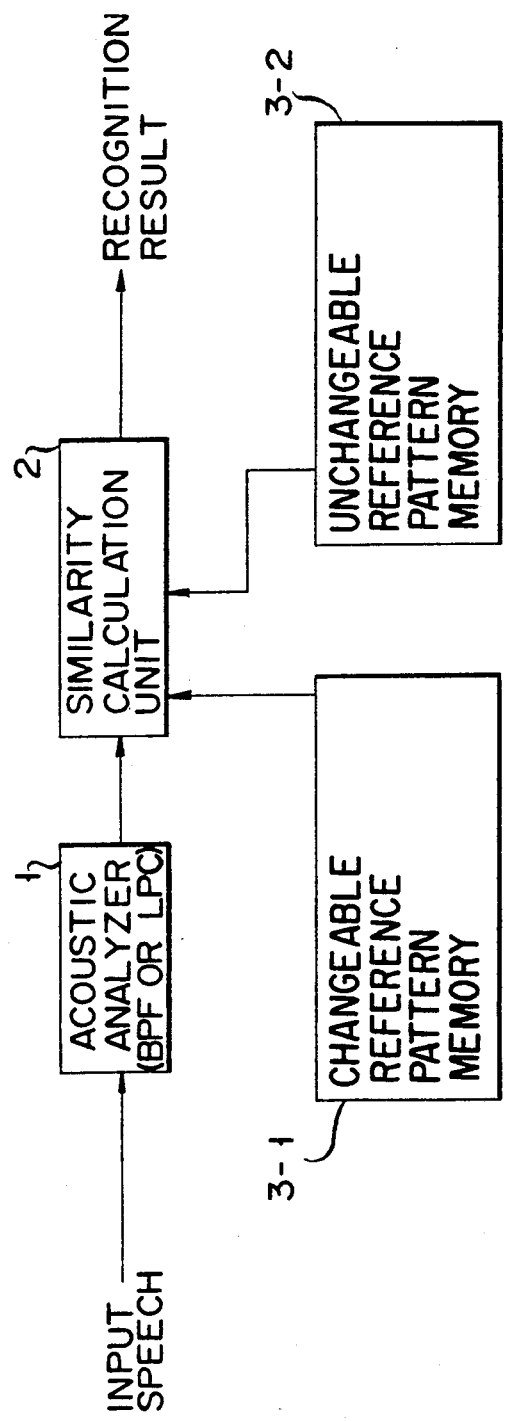
FIG. 2 is a block diagram showing a basic construction of a speech recognition apparatus according to one embodiment of the present invention.

FIG. 2 is a diagram showing the basic construction of a speech recognition apparatus according to one embodiment of the present invention. The speech to be recognized is input to an acoustic analyzer unit 1 and subjected to an acoustic analyzing process. The analyzed result output from the acoustic analyzer unit 1 is input to a similarity calculation unit 2. The similarity calculation unit 2 is sequentially supplied with memory data from a changeable reference pattern memory 3-1 in which data can be alterably registered. Registration-changeable standard pattern memory 3-1 stores speech reference patterns having different types of limitations on the speakers and the ways of utterance, for example, vocabularies corresponding to proper nouns and specified speakers, which are alterably registered. An unchangeable reference pattern memory 3-2 stores data that cannot be alterably registered stores general vocabularies corresponding to proper nouns and unspecified speakers. The similarity calculation unit 2 effects the calculation of similarity between the analyzed pattern output from the acoustic analyzer unit 1 and memory data from the reference pattern memory 3-1 or 3-2 by use of the same recognition algorithm and outputs an optimum recognition result.

Figure 3:
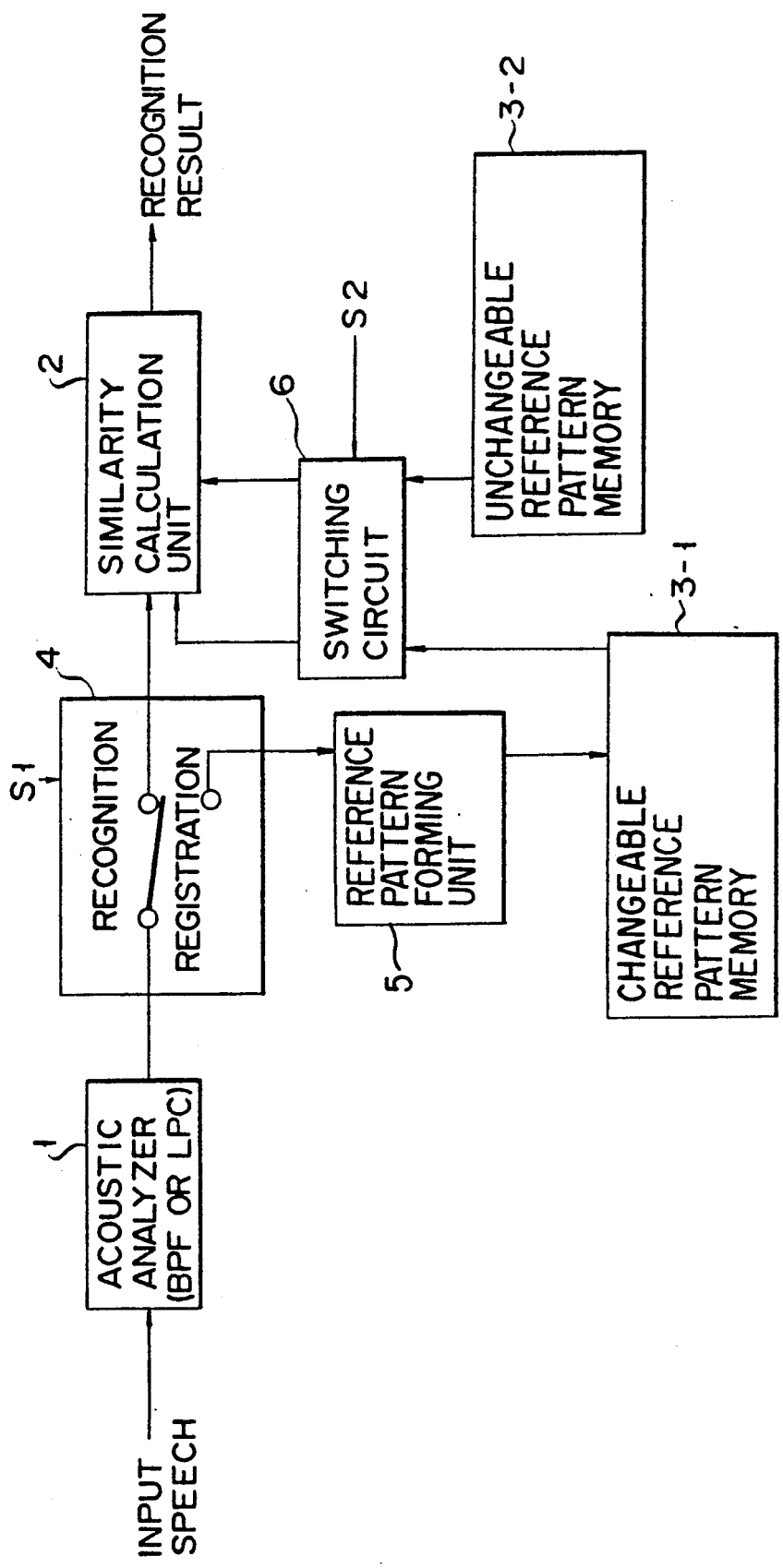
FIG. 3 is a block diagram showing further details of the construction of the speech recognition apparatus of FIG. 2.
Figure 4:
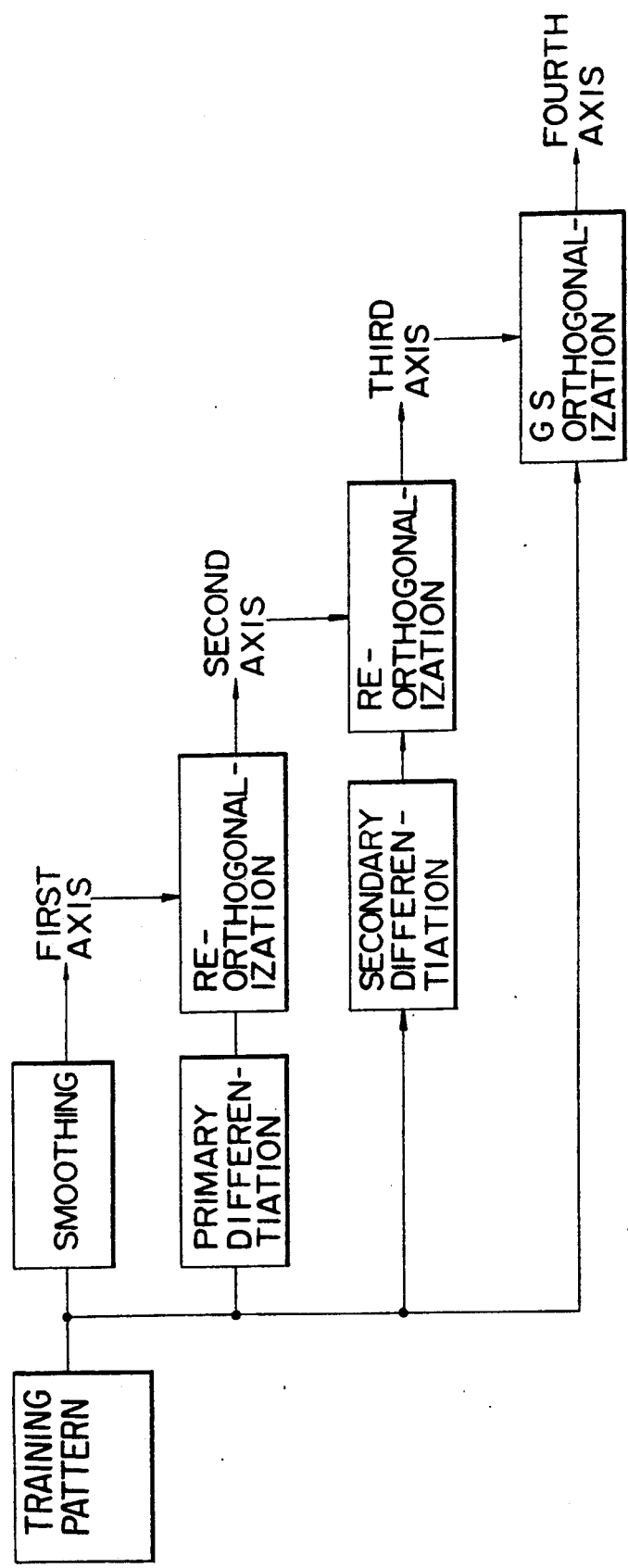
FIG. 4 is a block diagram showing an example of the construction of a reference pattern forming unit in the circuit of FIG. 3 and illustrating the differentiation-orthogonalization filtering method.

FIG. 3 is a block diagram showing further details of the speech recognition apparatus shown in FIG. 2. The construction of each of the blocks of FIG. 2 is explained below. An input speech is converted into spectral parameter time series by short-time spectrum analysis with a proper analysis window length of several tens of milliseconds by means of the acoustic analyzer unit 1. A band pass filter (BPF) or linear predictive coding (LPC) method is used for the above spectrum analysis. As the spectral parameter, characteristic vectors are used in the case of BPF analysis and various LPC spectra such as LPC cepstrum are used in the case of LPC analysis. An analyzed pattern output from the acoustic analyzer unit 1 is supplied to a destination which is determined by controlling the switching circuit 4 according to a switching control signal S1 supplied from a switching control unit (not shown) to set a recognition mode or a registration mode. When the switching circuit 4 is set in the registration mode, the analyzed pattern is supplied to the reference pattern forming unit 5. For example, a differentiation-orthogonalization filtering method, as shown in FIG. 4, is used in the reference pattern forming unit 5 to form a reference pattern. That is, the characteristic parameter of a speech output from acoustic analyzer unit 1 is smoothed as the training pattern on the time base to constitute a first axis. A second axis is created by reorthogonalization of the primary differentiation of the time base and the first axis, and a third axis is created by re-orthogonalization of the secondary differentiation of the time base and the second axis. Further, a fourth axis is created by Gram-Schmidt (GS) orthogonalization of the training pattern and the third axis. This method is described in detail in "SPECIFIED SPEAKER'S WORD SPEECH RECOGNIZING METHOD BY USE OF 1-5-19 DIFFERENTIATION-ORTHOGONALIZATION FILTER" in the paper of lecture in Japanese Acoustic Institute, October 1987, p. 37. The reference pattern thus created is stored into the changeable reference pattern memory 3-1.

When the switching circuit 4 is set in the recognition mode, an analyzed pattern output from the acoustic analyzer unit 1 is supplied to the similarity calculation unit 2. The similarity calculation unit 2 is sequentially supplied with memory data from the reference pattern memory 3-1 or 3-2 which is selected by controlling the switching circuit 6 by a switching control signal S2 output from the switching control unit (not shown), and the calculation of similarity between the analyzed pattern output from the acoustic analyzing unit 1 and the memory data is effected by use of the same recognition method. Thus, an optimum recognition result corresponding to the input speech can be obtained.

In order to create reference patterns for unspecified speakers having general vocabularies, such as numerals, which may be used by any person and which are stored in the unchangeable reference pattern memory 3-2, the following method may be used. First, spectral series for a large number of speakers are grouped (or clustered) for each word. Then, an average spectral series of speeches which belong to each cluster or the center of respective clusters is stored as a reference pattern (multi-template) into the reference pattern memory 3-2.

The reference pattern memories 3-1 and 3-2 may be formed by a RAM and a ROM, respectively. In this case, it is possible to provide an external memory device such as a floppy disk (FD) or hard disk (HD) as a common storage medium for the memories 3-1 and 3-2. When the reference pattern is filed in the FD or HD, the reference pattern may be repeatedly used.

A complex similarity calculation method is known as one example of the similarity calculation by the similarity calculation unit 2. The complex similarity calculation method is described in U.S. Pat. No. 739,890. That is, with this method, the similarity S can be given by the following equation:

$$S = \Sigma (x, \Psi m)^2 / \|x\|^2 \|\Psi m\|^2$$

where $\Psi m$ denotes reference pattern data for analyzed pattern data x of an input speech and m indicates the number of truncate planes and m=4 since the fourth axis is obtained in an example of FIG. 4. The number of truncate planes can be set to a value other than 4. A category having the largest one of the similarities S obtained in the above equation is output as a recognition result.

With the above construction, since the calculation of similarity between each of various types of reference patterns having different types of limitations on the speakers and the ways of utterance and an input speech can be effected by the same similarity calculation unit 2, the apparatus can have a simple construction, thereby reducing the cost thereof. The method using the differentiation-orthogonalization filter and effected in the reference pattern forming unit 5 can attain a high performance with a small number of training samples and can utilize the recognition method of the complex similarity calculation method as it is. A method of forming various types of reference patterns by use of the changeable reference pattern memory 3-2 can be effected with a high degree of matching with the method of the complex similarity calculation method in a wide range. Therefore, the speech recognition performance will not be lowered just because the similarity calculation unit 2, which is commonly used, is provided.

The methods of forming and clustering the reference patterns can be effected by various other methods and are not limited to those discussed with regard to the above embodiment. Further, the similarity calculation method can be any type of method by which the similarities for various reference patterns can be calculated in the same manner.

As described above, according to this invention, a speech recognition apparatus can be provided which can be formed with a small size and low cost without lowering the speech recognition performance even when different types of limitations are imposed on the speakers and the ways of utterance.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A speech recognition apparatus comprising:
   acoustic analyzing means for extracting characteristic parameters from an input speech to generate analyzed patterns;
   first speech reference pattern storing means for storing speech reference patterns which are formed for specified speakers and can be alterably registered;
   second speech reference pattern storing means for storing speech reference patterns which are formed for unspecified speakers and cannot be alterably registered; and
   similarity calculation means for effecting the calculation of similarities between the analyzed pattern generated from said acoustic analyzing means and the speech reference patterns from said first and second speech reference pattern storing means by use of a common recognition algorithm.

2. A speech recognition apparatus according to claim 1, wherein said acoustic analyzing means is an acoustic analyzing unit for subjecting the input speech to the short-time spectral analysis with a predetermined window length and converting the input speech into spectral parameters series.

3. A speech recognition apparatus according to claim 2, wherein said acoustic analyzing means includes a band pass filter (BPF) and the characteristic vector of the BPF is used as the spectral parameter.

4. A speech recognition apparatus according to claim 2, wherein said acoustic analyzing means includes a linear predictive coding (LPC) unit and the LPC spectrum is used as the spectral parameter.

5. A speech recognition apparatus according to claim 4, wherein said LPC spectrum includes LPC cepstrum.

6. A speech recognition apparatus according to claim 1, which further comprises reference pattern forming means for forming reference patterns based on the characteristic parameter supplied from said acoustic analyzing means and in which the reference pattern formed by said reference pattern forming means is stored into said first speech reference pattern storing means.

7. A speech recognition apparatus according to claim 6, wherein the reference pattern forming operation by said reference pattern forming means is effected by use of differentiation-orthogonalization filtering method.

8. A speech recognition apparatus according to claim 1, further comprising first switching means for determining whether the characteristic parameter extracted by said acoustic analyzing means is supplied to said similarity calculation means or stored into said first speech reference pattern storing means; and second switching means for determining whether the speech reference pattern stored in said first speech reference pattern storing means or the speech reference pattern stored in said second speech reference pattern storing means is supplied to said similarity calculation means.

9. A speech recognition apparatus according to claim 1 wherein the recognition algorithm of said similarity calculation means is a complex similarity calculation method.

10. A speech recognition apparatus, comprising:
    acoustic analyzing means for extracting characteristic parameters from an input speech to generate an analyzed pattern;
    first speech reference pattern storing means for storing speech reference patterns which are formed for specified speakers and can be alterably registered;
    second speech reference pattern storing means for storing speech reference patterns which are formed for unspecified speakers and cannot be alterably registered;
    similarity calculation means for effecting the calculation of similarities between the analyzed pattern generated from said acoustic analyzing means and a speech reference pattern from one of said first and second speech reference pattern storing means by use of a common recognition method;
    reference pattern forming means for forming reference patterns based on the characteristic parameter extracted by said acoustic analyzing means and in which the reference pattern formed by said reference pattern forming means is stored into said first speech reference pattern storing means;
    first switching means for supplying the characteristic parameter extracted by said acoustic analyzing means to one of said similarity calculation means and said reference pattern forming means, and for selecting one of a recognition mode and a registration mode; and
    second switching means for supplying one of the speech reference patterns stored in said first speech reference patterns storing means and the speech reference patterns stored in said second speech reference pattern storing means to said similarity calculation means; and wherein, when the first switching means selects the recognition mode, the first switching means supplies the characteristic parameter extracted by said acoustic analyzing means to said similarity calculating means, and the second switching means supplies the speech reference pattern selected from one of said first and second speech reference pattern storing means to said similarity calculation means, and, wherein, when the first switching means selects the registration mode, the first switching means supplies the characteristic parameter extracted by said acoustic analyzing means to the reference pattern forming means to form a reference pattern, and the reference pattern forming means stores the formed reference pattern in the first reference pattern storing means.

* * * * *